US008601302B2

(12) United States Patent
Lachwani et al.

(10) Patent No.: US 8,601,302 B2
(45) Date of Patent: Dec. 3, 2013

(54) PROCESSOR SYSTEM IN LOW POWER STATE RETENTION MODE WITH LINEAR REGULATOR OFF AND SWITCH REGULATOR LOW IN POWER MANAGEMENT IC (75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 348 days.

(21) Appl. No.: 12/488,814

(22) Filed: Jun. 22, 2009

(65) Prior Publication Data

US 2010/0325457 A1 Dec. 23, 2010

(51) Int. Cl.
G06F 1/32 (2006.01)

(52) U.S. Cl.
USPC .......................................... 713/323; 713/340

(58) Field of Classification Search
None
See application file for complete search history.

(56) References Cited

U.S. PATENT DOCUMENTS

| | | | |
|---|---|---|---|
| 5,189,647 A | 2/1993 | Suzuki et al. | |
| 5,388,265 A | 2/1995 | Volk | |
| 6,715,091 B1 | 3/2004 | Kundu | |
| 7,042,263 B1 | 5/2006 | Johnson et al. | |
| 7,120,911 B1 | 10/2006 | Katayama | |
| 7,340,624 B2 | 3/2008 | Kurakane | |
| 8,046,617 B2 * | 10/2011 | Fleck et al. | 713/324 |
| 2003/0006807 A1 | 1/2003 | Masuda et al. | |
| 2003/0105983 A1 | 6/2003 | Brakmo et al. | |
| 2004/0128569 A1 | 7/2004 | Wyatt et al. | |
| 2006/0041766 A1 | 2/2006 | Adachi | |
| 2007/0079148 A1 | 4/2007 | Pastorello et al. | |
| 2007/0220289 A1 | 9/2007 | Holle et al. | |
| 2008/0072087 A1 | 3/2008 | Bibikar et al. | |
| 2008/0080648 A1 | 4/2008 | Leung et al. | |
| 2008/0307240 A1 | 12/2008 | Dahan et al. | |
| 2008/0313487 A1 | 12/2008 | Mochizuki et al. | |
| 2009/0153108 A1* | 6/2009 | Hendin et al. | 323/234 |
| 2009/0193230 A1 | 7/2009 | Findeisen et al. | |
| 2009/0235104 A1 | 9/2009 | Fung | |
| 2010/0060078 A1* | 3/2010 | Shaw | 307/31 |
| 2010/0185820 A1* | 7/2010 | Hughes et al. | 711/135 |
| 2010/0218183 A1 | 8/2010 | Wang et al. | |
| 2010/0250974 A1* | 9/2010 | Ristic et al. | 713/300 |
| 2011/0025383 A1 | 2/2011 | De Martini et al. | |
| 2011/0154080 A1 | 6/2011 | Wang et al. | |
| 2011/0296215 A1 | 12/2011 | Mobin et al. | |

OTHER PUBLICATIONS

PCT Search Report for PCT Application No. PCT/US10/39194, mailed Jun. 18, 2008 (9 pages).

(Continued)

*Primary Examiner* — Kenneth Kim
(74) *Attorney, Agent, or Firm* — Lee & Hayes, PLLC (57) ABSTRACT A quiescent state retention mode (QSRM) permits minimal power consumption and dissipation by an electronic device while idle without producing adverse latencies to users or causing system instability. Upon a call to enter the QSRM, processes may be frozen, clocks may be gated, switching regulators may be placed in low power mode, SDRAM may be placed into self-refresh mode, caches may be flushed, IRQs may be disabled, and the system waits for interrupt to wakeup. In the QSRM, powered components include the switching regulator configured to provide power to the processor is maintained in a low power mode while the SDRAM is placed in self-refresh.

23 Claims, 4 Drawing Sheets

(56) References Cited

OTHER PUBLICATIONS

"Freescale Semiconductor Date Sheet: Technical Data—MIMX31 and MCIMX31L Multimedia Applications Processors" Document Number: MCIMX31, <<http://www.freescale.com/files/32bit/doc/data_sheet/MCIMX31.pdf?fsrch=1>>, available at least as early as Nov. 2008, 122 pages.

Office action for U.S. Appl. No. 12/890,003, mailed on Jan. 25, 2013, Lachwani et al., "Deep Idle Mode", 9 pages.

Office action for U.S. Appl. No. 12/890,003, mailed on May 14, 2013, Lachwani et al., "Deep Idle Mode", 15 pages.

"Freescale Semiconductor Date Sheet: Technical Data—MIMX31 and MCIMX31L Multimedia Applications Processors" Document No. MCIMX31, <<http://www.freescale.com/files/32bit/doc/data_sheet/MCIMX31.pdf?fsrch=1>>, available at least as early as Nov. 2008, 122 pages.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, chapter 3 (pp. 195-266).

\* cited by examiner

PROCESSOR SYSTEM IN LOW POWER STATE RETENTION MODE WITH LINEAR REGULATOR OFF AND SWITCH REGULATOR LOW IN POWER MANAGEMENT IC

BACKGROUND

Electronic devices such as electronic book readers ("e-book readers"), cellular telephones, portable media players, tablet computers, netbooks, personal digital assistants, and other electronic devices, rely on electrical power to function.

Within these electronic devices, several components utilize significant amounts of power during operation, including the processor(s) and peripheral devices. These peripheral devices include external memory interfaces (EMIs), Universal Serial Bus (USB) controllers, serial peripheral interfaces (SPIs), inter-integrated circuit (I2C) bus controllers, audio devices, image processing unit (IPU), input devices, realtime clock, synchronous serial interface (SSI), NOR flash memory controller, NAND flash memory controller (NFC), smart direct memory access controller (SDMA), multi-media card (MMC) storage controller, and so forth. In some implementations, the USB, NFC, IPU, SDMA, and other peripherals may move data to and from the SDRAM via the EMI. These peripheral devices may reside on the same "chip" or die as the processor, be on another die, or a combination.

A processor not actively in use, but idling in a run mode, consumes significant quantities of power. This idling wastes energy as well as increasing the amount of heat dissipated by the electronic device. Reducing power consumption increases the usable time for a portable device operating from a battery. Reducing power consumption also reduces the heat dissipated by the electronic device, allowing it to operate at a cooler temperature and thus increasing the life of the equipment and simplifying design for cooling.

Various schemes have been put forth to reduce power consumption in portable consumer devices by placing the processor of the device and the peripherals into a "sleep" mode. Typically, entering the sleep mode involves turning off unused portions of and/or reducing clock speed of the microprocessor.

However, these techniques result in only moderate power savings. Furthermore, the current techniques used to enter and exit sleep mode often introduce unacceptable latencies to execution of commands, and may cause system instability upon re-entry to a running mode.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As described above, electronic devices utilize low power modes to reduce power consumption and heat dissipation. The electronic devices may be electronic book readers ("e-book readers"), cellular telephones, portable media players, tablet computers, netbooks, personal digital assistants, embedded devices, and the like.

Existing low power modes only moderately reduce power consumption, introduce unacceptable latencies to the execution of commands, and may cause system instability upon re-entry to a run mode.

Disclosed is process and system for leveraging and enhancing a state retention mode of an electronic device allowing the device to enter a new low power mode termed "quiescent state retention mode" (QSRM). Electronic devices may now enter this QSRM and drastically reduce power consumption while remaining able to quickly and reliably resume stable running operations.

In one implementation, the QSRM may be executed by an electronic device utilizing a processor capable of gating clocks discretely, providing a wait for interrupt instruction, and having an onboard or external power management integrated circuit (PMIC). Gating is the ability to shutdown a selected portion or portions of a circuit. The PMIC may include linear regulators and switching regulators capable of transitioning between run, low power, and off states. For example, the i.MX architecture and the Atlas PMIC MC13783 from Freescale™ Semiconductor Incorporated, of Austin, Tex., United State of America, is one suitable family of processors and PMICs. Other systems-on-a-chip (SOC) may be used as well.

The processor executes an operating system such as, but not limited to, Linux®, UNIX®, Microsoft Corporation of Redmond, Wash.'s Microsoft Windows®, Microsoft Corporation's Windows Mobile®, Apple Corporation of Cupertino, Calif.'s Mac OS®, Apple Corporation's Mac OS X®, and Wind River Systems Inc. of Alameda Calif.'s VxWorks®.

For example, an e-book reader or other electronic device may incorporate a Freescale™ processor having an i.MX architecture and executing a Linux® kernel. The kernel uses device drivers to communicate with devices such as a power management integrated circuit (PMIC), serial peripheral interfaces (SPIs), external memory interfaces (EMIs), Universal Serial Bus (USB) controllers, image processing unit (IPU), smart direct memory access (SDMA), multi-media card (MMC) storage controller, and so forth. These peripheral devices may reside on the same "chip" or die as the processor as in the case of the i.MX architecture, be on another die, or a combination of the two.

In one implementation, upon initiation by a user space process, the processor transitions into a QSRM. After successful entry into QSRM, components which continue drawing power include the PMIC in a low power standby mode with a switching regulator feeding the CPU remaining in a low power mode, and an external memory in self-refresh mode when the memory requires refresh. In other implementations a display and/or a WWAN radio may also remain in an active or standby mode during QSRM. QSRM may also be used in conjunction with a quiescent doze mode (QDM), as described in co-pending application Ser. No. 12/261,980, filed Oct. 30, 2008, by the same inventors.

A wakeup source may trigger a resumption of normal operation. Wakeup sources may include a power button, charger detection (such as that generated by the PMIC upon attachment of an external power source), or realtime clock in the PMIC, which generate interrupts. Upon receipt of an interrupt from a wakeup source, the processor un-gates or enables clocks, enables interrupts, and otherwise restores system state. Device drivers of the input/output devices bring the input/output devices back to the previous known good state using a good saved state. The processor is now in run mode and ready to execute the task which triggered the interrupt. When the processor returns to idle, the device may again enter QSRM.

Illustrative Environment in Quiescent State Retention Mode

Figure 1:
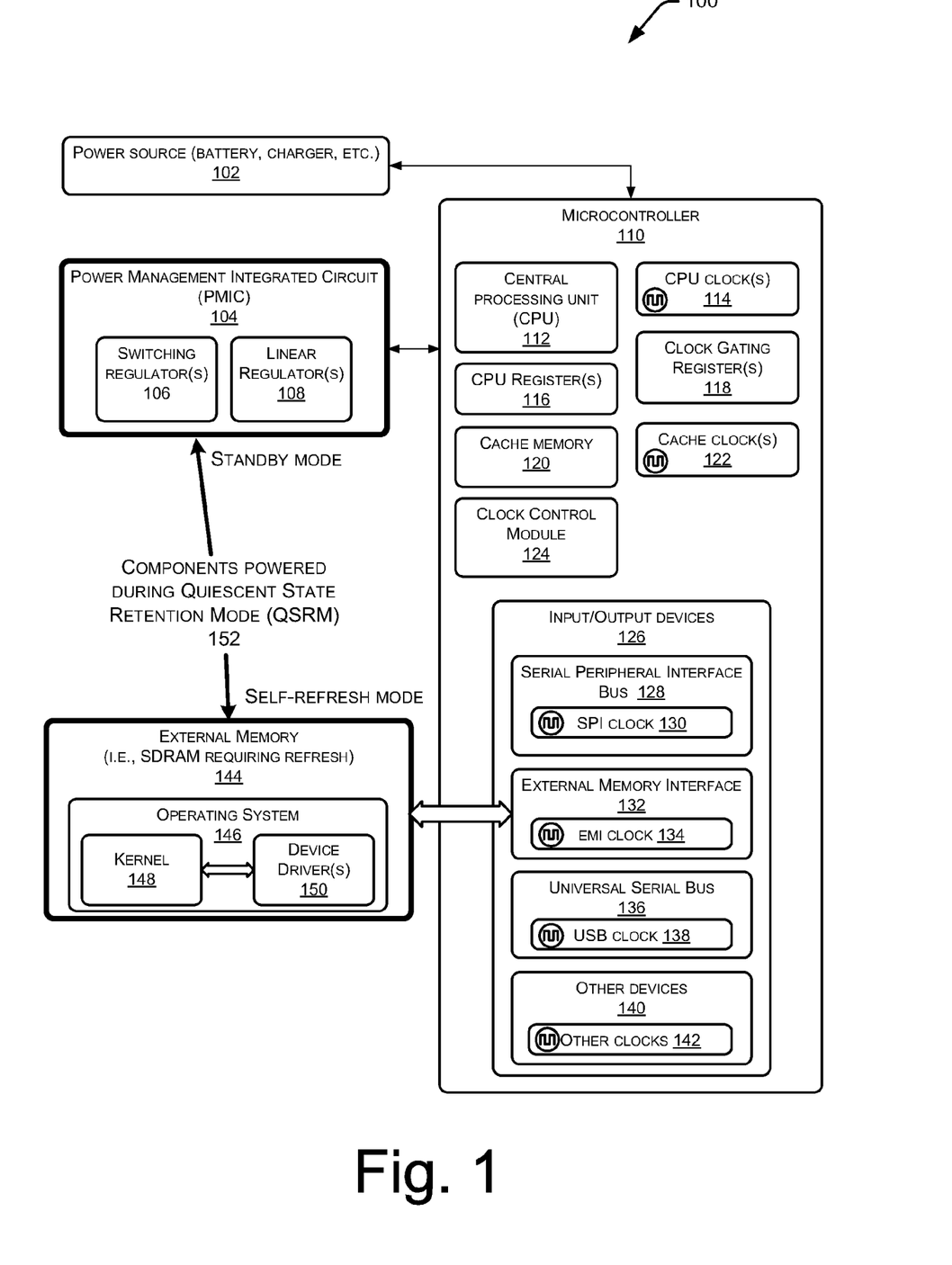
FIG. 1 is a schematic of an illustrative computer system in an quiescent state retention mode (QSRM).

FIG. 1 is an illustrative schematic of a computer system 100 in QSRM. In one implementation, computer system 102 may be an e-book reader. However, computer system 100 may also be used in cellular telephones, portable media players, netbooks, personal digital assistants, and the like.

A power source 102 such as a battery, power supply, charger, solar panel, etc., provides power for the computer system 100. A power management integrated circuit (PMIC) 104 uses the power from power source 102 to provide power with characteristics to properly operate other devices in the computer system 100. PMIC 104 is coupled to microcontroller 110, which in some implementations may be accomplished using SPI or I2C. PMIC 104 may include one or more switching regulators 106 and/or linear regulators 108. A switching regulator 106 provides the capability to produce a desired output voltage from a high or low input voltage. When the output voltage exceeds the input voltage, this is a "boost." When the output voltage is less than the input voltage, this is a "buck." A linear regulator 108 provides the capability to buck an input voltage, that is, produce an output voltage lower than the input voltage. Switching regulators 106 generally offer higher power conversion efficiency and increased design flexibility over linear regulators 108 given their ability to buck or boost, invert voltages, etc.

Power delivery by the PMIC 104 is illustrated in the following example: Suppose a computer system has a 1.5 volt battery (when fully charged), a processor requiring 1.65 volts, and another device requiring 1.1 volts. PMIC 104 may be configured to use a switching regulator to boost the 1.5 volts from the battery to the 1.65 volts required by the processor. A linear regulator may be configured to drop the 1.5 volt battery voltage to the 1.1 volts required by the other device. In another example, output from a 3.8 volt battery may be bucked by the switching regulator to provide 1.8 volts to SDRAM during run mode and 1.7V in QSRM.

A microcontroller 110 is shown in computer system 100. Microcontroller 110 includes a central processing unit (CPU) 112, CPU clocks 114, CPU register(s) 116, clock gating register(s) (CGR) 118, cache memory 120 which may include a primary and/or secondary cache, cache clock(s) 122, and clock control module (CCM) 124.

Also within microcontroller 110 are input/output devices 126 which may include the following:

A serial peripheral interface (SPI) bus 128 and associated SPI clock 130.

An external memory interface (EMI) 132 and associated EMI clock 134, which may be operatively coupled to external memory 144 described below.

A universal serial bus (USB) controller 136 and associated USB clock 138. The controller 136 may comply with any of the USB standards including USB 1.0, 1.1, 2.0, 3.0 as set forth by the USB Implementers Forum. The USB 136 controller may be divided into a USB host controller coupled to a WWAN radio and a USB gadget controller.

Within microcontroller 110 there may be other devices 140 having associated clocks 142. These other devices 140 may include a IEEE 1394 bus, camera, global positioning system, Bluetooth™, audio, PC Card device, MMC controller, NFC, MMC storage, etc.

EMI 132 may be coupled to external memory 144, which may comprise Static Random Access Memory (SRAM), Pseudostatic Random Access Memory (PSRAM), Synchronous Dynamic Random Access Memory (SDRAM), Double Data Rate SDRAM (DDR), NAND Flash, Magnetoresistive Random Access Memory (MRAM), Memristor Random Access Memory (MemRAM), and the like.

In some implementations, input/output devices 126 may also connect to the external memory 144 via the EMI 132. For example, USB controllers, audio devices, IPUs, MMC storage controllers, and other devices may connect to external memory 144 via the EMI 132.

External memory 144 may store an operating system 146 comprising a kernel 148 operatively coupled to device driver(s) 150. QSRM instructions may reside in the kernel 148. QSRM instructions for PMIC 104 may reside in device driver(s) 150. Device driver 150 operatively couples input/output devices 126 to kernel 148.

Operative couplings, such as that between kernel 148 and device driver 150, are shown for emphasis. All devices shown in FIG. 1 are operatively coupled, with their respective arrows omitted only for clarity of illustration.

During QSRM, powered components 152 include PMIC 104 in low power mode and external memory 144 in self-refresh mode. In self-refresh mode, the external memory is able to refresh memory cells without external input from a memory controller or other component. In some implementations, external memory may be SDRAM, DDR, etc.

Figure 2:
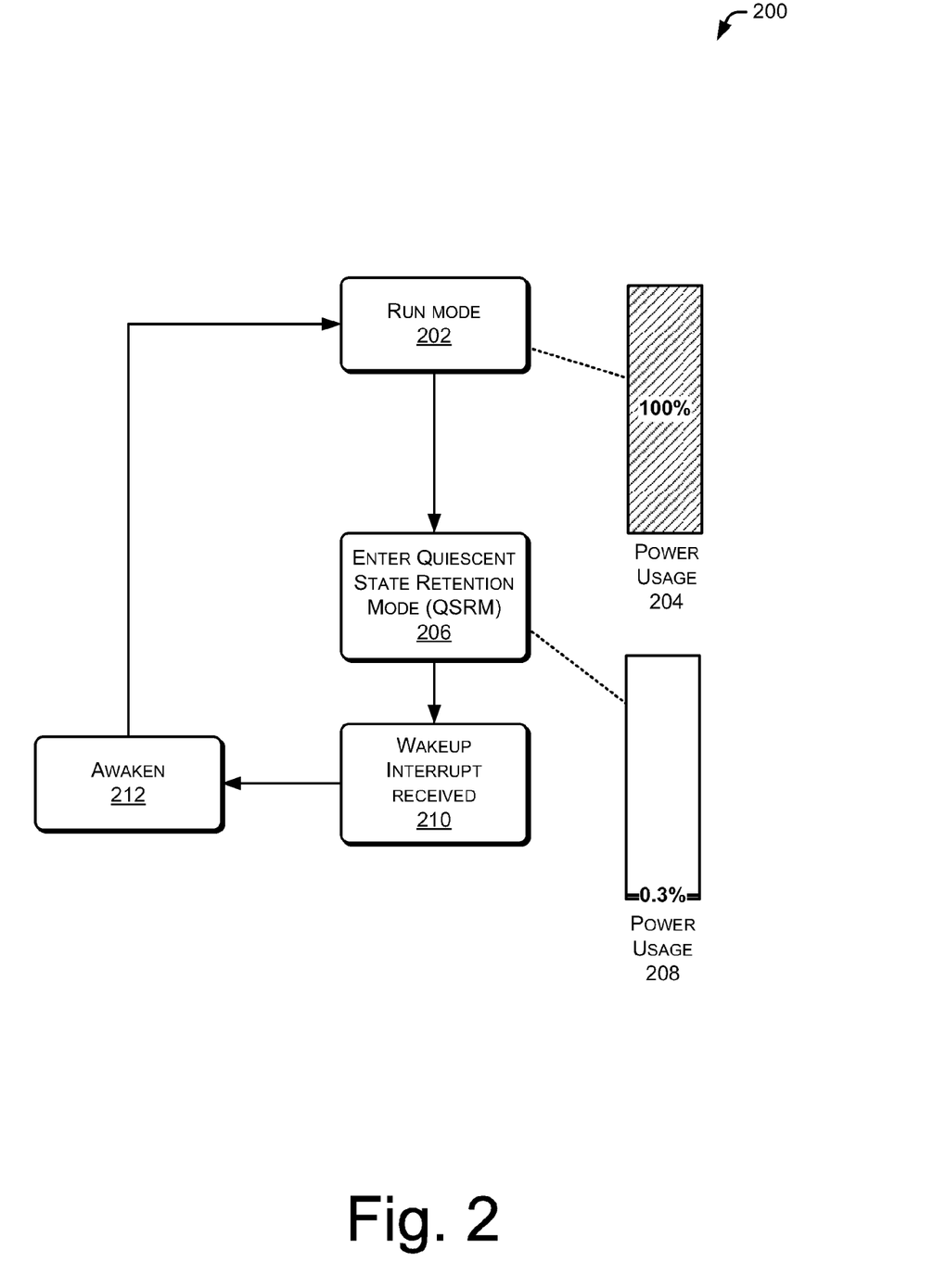
FIG. 2 is a flow diagram showing an illustrative overall process of transitioning from run mode to the QSRM and back to run mode, as well as showing relative power consumption of these two modes.

FIG. 2 shows an overall process 200 of transitioning from run mode to QSRM and back to run mode, as well as showing relative power consumption of these two modes. The process 200 (as well as the process of FIG. 3 below) is illustrated as a collection of blocks in a logical flow graph, which represent a sequence of operations that may be implemented in hardware, software, or a combination thereof. In the context of software, the blocks represent computer-executable instructions that, when executed by one or more processors, perform the recited operations. Unless otherwise indicated, the order in which the operations are described is not intended to be construed as a limitation, and other combinations may implement the process. For discussion purposes, the process 200 (as well as process 300 below) is described with reference to the environment of FIG. 1.

At 202, computer system 100 is shown operating in run mode. In run mode, graph 204 shows computer system 100 with a maximum power usage of 100%. In an illustrative e-book reader, while a task such as flipping pages is running on the microcontroller a current draw of about 200 milliamperes (mA) is observed. When turning a wide area networking (WAN) module on or off, peak power consumption may increase to about 400 mA, and while accessing an online store the device may use about 300-350 mA.

Once a page has been turned, or data has been transferred using the WAN module, the computer system 100 may wait for the user to take an action, such as finish reading the page which is displayed and change to the next page. At 206, the computer system 100 may enter QSRM while waiting for user input or some other wakeup event. Entry into QSRM may be initiated in response to a user input, in response to an executing process, or in response to another determination. Entry to QSRM is discussed in more depth below in FIG. 3.

While in QSRM, graph 208 shows the power consumption for the illustrative e-book reader at approximately 0.67 mA, or about 0.3% of the 200 mA power consumption during run mode 202. In comparison, the quiescent doze mode (QDM), as described in co-pending application Ser. No. 12/261,980, filed Oct. 30, 2008, by the same inventors, reduces power consumption to about 17.4 mA. Thus, QSRM consumes only about 3.8% of the power compared to QDM. QSRM may be used in conjunction with QDM. For example, QDM involves coordination between device drivers and the kernel to minimize power consumption as well as dynamically increasing timer interrupt intervals. Thus, computer system 100 may transition between run mode, QDM, QSRM, as appropriate.

At 210, a wakeup interrupt is received, and at 212, the computer system 100 awakens. Awakening 212 enables clocks and interrupts, and restores the system to a run mode 202. In the exemplary e-book reader, wakeup times from QSRM are typically relatively short (in the range of 200-300 ms), and incur no additional overhead or latencies. By providing the stable and reliable transition to and from QSRM, in combination with maintaining selected power regulators on the PMIC in a low power mode, it becomes possible to achieve these rapid wakeup times. With wakeup times in this range, it becomes possible to more frequently place the computer system into the QSRM while maintaining reasonable user responsiveness. Thus significant power reduction is possible.

Illustrative Process for Entering QSRM

Figure 3:
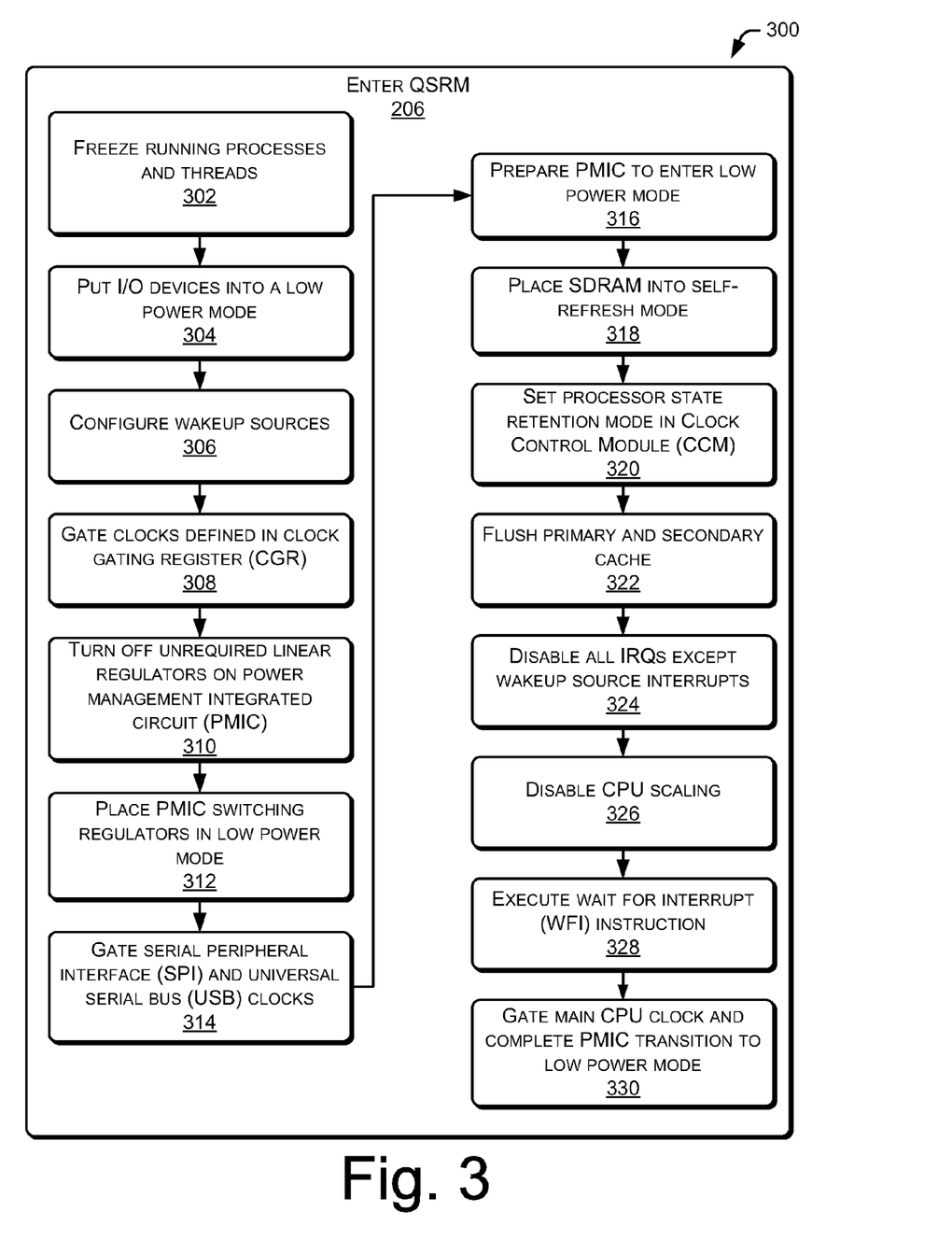
FIG. 3 is a flow diagram of an illustrative process of entering the QSRM.

FIG. 3 is an illustrative flow diagram of the process 206 for entering the QSRM shown in FIG. 1. In one implementation, to achieve low latencies during awakening logic, circuits may remain powered while clocks are gated.

At 302, processes and threads executing on the CPU are frozen. This may include freezing all kernel threads and user-space processes. When a kernel thread of a user process refuses to freeze, the freeze process may be aborted and the kernel may resume operation. In one implementation, the kernel may execute the following instructions:

---
C Sample Code 1
---
```
pm_suspend( );
enter_state( );
suspend_prepare( );
// See kernel/power/main.c
```
---

At 304, input/output devices are placed into a low power mode. Device drivers may save device state into external memory 144. Once device state is saved, the device may be placed into a low power mode or turned off, and clocks driving the device may be gated. During wakeup, the device driver restores this good saved state and input/output device operation resumes. In one implementation, the kernel may execute the following instructions:

---
C Sample Code 2
---
```
suspend_devices_and_enter( )
// See kernel/power/main.c
```
---

At 306, wakeup sources are configured. These wakeup sources may include a power management event, a network interface, a realtime clock, or a power button. Power management events may be generated by PMIC 104 and include attachment or removal of a charger, availability of surplus power, etc. In one implementation, the kernel may execute the following instructions:

---
C Sample Code 3
---
```
__raw_writel(~((1 << 23)  |  (1 << 16)  |  7),
MXC_CCM_WIMR);
// in function mxc_pm_lowpower( )
// See arch/arm/mach-mx3/mxc_pm.c
```
---

At 308, clocks defined in a clock gating register (CGR) may be gated. By way of example and not limitation, clocks that may be present in the CGR in a processor of the i.MX family include: CGR0, CGR1, CGR2, MXC_CCM_CGR0, MXC_CCM_CGR1, MXC_CCM_CGR2, etc.

At 310, unrequited linear regulators on the PMIC 104 are turned off. An unrequired linear regulator is a linear regulator which provides power to a clock or device which has been gated. Remaining linear regulators may be placed into a low power mode.

At 312, switching regulators 106 on the PMIC 104 are placed into a low power mode. As described in more detail below with regards to FIG. 4, switching regulators are unable to provide power quickly enough when re-activated from an off state. Thus, keeping the switching regulators 106 in low power mode allows for reduced latency upon awakening while increasing stability. In one implementation, for example where the Atlas PMIC MC13783 is used, the kernel may execute the following instructions in function ---
C Sample Code 4
---
```
mx31_pm_prepare( ):
pmic_power_regulator_off(SW_PLL);
/*
* Turn off Audio ciruitry and VAUDIO
*/
pmic_power_regulator_off(REGU_VVIB);
pmic_power_regulator_off(REGU_VAUDIO);
pmic_power_regulator_set_lp_mode(REGU_VDIG,
LOW_POWER_CTRL_BY_PIN);
pmic_power_regulator_set_lp_mode(REGU_GPO1,
LOW_POWER_CTRL_BY_PIN);
pmic_power_regulator_set_lp_mode(REGU_GPO2,
LOW_POWER_CTRL_BY_PIN);
pmic_power_regulator_set_lp_mode(REGU_GPO3,
LOW_POWER_CTRL_BY_PIN);
    /*
* When the WAN is off we may enable low power on GPO4
*/
if ( (wan_get_power_status( ) == WAN_OFF)  ||
    (wan_get_power_status( ) == WAN_INVALID) )  {
        /* WAN is OFF */
pmic_write_reg(REG_POWER_MISCELLANEOUS,
(1 << 13), (1 << 13));
}
else {
    /* WAN is ON */
    pmic_write_reg(REG_POWER_MISCELLANEOUS,
(0 << 13), (1 << 13));
}
pmic_power_regulator_set_lp_mode(REGU_VAUDIO,
LOW_POWER_CTRL_BY_PIN);
    pmic_power_regulator_set_lp_mode(REGU_VIOHI,
LOW_POWER_EN);
    pmic_power_regulator_set_lp_mode(REGU_VIOLO,
LOW_POWER_EN);
```

The switching regulators may be configured for low power on startup. In one implementation, again for example where the Atlas PMIC MC13783 is used, the kernel may execute the following instructions:

---
C Sample Code 5
---

```
/* Enable 4 mc13783 output voltages */
pmic_write_reg(REG_ARBITRATION_SWITCHERS, (1 << 5),
(1 << 5));
/* Enable mc13783 voltage ready signal */
pmic_write_reg(REG_INTERRUPT_MASK_1, (0 << 11), (1 <<
11));
     /*
     * standby voltages on switching regulators and the
power mode
     */
volt.swla = SW1A_0_95V;
pmic_power_switcher_set_stby(SW_SW1A, volt);
pmic_power_switcher_set_mode(SW_SW1A, LOW_POWER, 1);
pmic_power_switcher_set_mode(SW_SW1B, LOW_POWER, 1);
pmic_power_switcher_set_mode(SW_SW2A, LOW_POWER, 1);
volt.sw2b = SW2B_1_7V;
pmic_power_switcher_set_stby(SW_SW2B, volt);
pmic_power_switcher_set_mode(SW_SW2B, LOW_POWER, 1);
     pmic_power_regulator_off(SW_SW3);
pmic_power_regulator_off(REGU_VGEN);
pmic_power_regulator_off(REGU_VSIM);
pmic_power_regulator_off(REGU_VESIM);
pmic_power_regulator_off(REGU_VCAM);
pmic_power_regulator_off(REGU_VRFBG);
pmic_power_regulator_off(REGU_VRF1);
pmic_power_regulator_off(REGU_VRF2);
pmic_power_regulator_off(REGU_VRFCP);
pmic_power_regulator_off(REGU_VRFREF);
pmic_power_regulator_off(REGU_VRFDIG);
pmic_power_regulator_off(REGU_GPO2); /* Nothing */
// See arch/arm/mach-mx3/dvfs_v2.c and arch/arm/mach-
mx3/pm.c
```

At 314, the serial_pll and usb_pll clock are now gated. In some implementations, the status of a wide area networking (WAN), local area networking (LAN), or other device(s) utilizing the USB for communication with the processor may be checked. When the status of any WAN or other USB connected device is "OFF" and not "ON", the USB and related clocks may be gated. In one implementation, the kernel may execute the following instructions:

---
C Sample Code 6
---

```
__raw_writel(__raw_readl(MXC_CCM_CCMR) |
MXC_CCM_CCMR_FPME,
     MXC_CCM_CCMR);
__raw_writel(__raw_readl(MXC_CCM_CCMR) &
~MXC_CCM_CCMR_MPE,
     MXC_CCM_CCMR);
__raw_writel((__raw_readl(MXC_CCM_CCMR) &
     ~MXC_CCM_CCMR_PRCS_MASK) |
     (1 << MXC_CCM_CCMR_PRCS_OFFSET),
     MXC_CCM_CCMR);
//See arch/arm/mach-mx3/mxc_pm.c
```

At 316, preparations are made for the PMIC 104 to enter low power mode. For example, in MX31 processors, a VSTBY pin is connected to the PMIC 104's VSTBY pin. When the clock control module 124 is configured to pull VSTBY low on a wait for interrupt (WFI), it pulls down the VSTBY pin that in turn pulls down the PMIC 104's VSTBY pin and pushes the PMIC into low power mode. In one implementation, the kernel may execute the following instructions:

---
C Sample Code 7
---

```
reg = __raw_readl(MXC_CCM_CCMR);
reg = (reg & (~MXC_CCM_CCMR_LPM_MASK))  |
     lpm << MXC_CCM_CCMR_LPM_OFFSET  |
     MXC_CCM_CCMR_VSTBY;
__raw_writel(reg, MXC_CCM_CCMR);
//See arch/arm/mach-mx3/mxc_pm.c
```

At 318, SDRAM, or other memory 144 requiring refresh may be placed into a self refresh mode, where the memory refreshes itself without external inputs. A switching regulator 106 providing power to the memory 144 may be placed in a low power mode. In one implementation, such as the MX31 architecture where the SDRAM may be powered by switching regulator SW2 the kernel may execute the following instructions:

---
C Sample Code 8
---

```
volt.sw2b = SW2B_1_7V;
pmic_power_switcher_set_stby(SW_SW2B, volt);
pmic_power_switcher_set_mode(SW_SW2B, LOW_POWER, 1);
//See function pmic_voltage_init( ) in arch/arm/mach-
mx3/dvfs_v2.c
```

At 320, a state retention mode is set in the clock control module 124. In one implementation the kernel may execute the following instructions:

---
C Sample Code 9
---

```
/* Enabled Well Bias
 * SBYCS = 0, MCU clock source is disabled*/
mxc_ccm_modify_reg(MXC_CCM_CCMR,
     MXC_CCM_CCMR_WBEN | MXC_CCM_CCMR_SBYCS,
     MXC_CCM_CCMR_WBEN);
// See mxc_pm_lowpower( ) in arch/arm/mach-
mx3/mxc_pm.c
```

At 322, primary and secondary caches may be flushed. Flushing the caches keeps them in sync with the external memory 144 and avoids incorrect data being present upon resumption of a run state. In one implementation the kernel may execute the following instructions:

---
C Sample Code 10
---
flush_cache_all( )

---

At 324, all interrupt requests (IRQs) are disabled, except those from wakeup sources. For example, an interrupt from a power button, or PMIC power event, etc. would remain enabled. In one implementation the kernel may execute the following instructions:

---
C Sample Code 11
---

```
local_irq_disables( );
...
__raw_writel(INT_GPT, AVIC_INTDISNUM); /* Disable
```

-continued

C Sample Code 11

```
    timer */
    ...
    /* Configure wakeup sources */
    __raw)__writel(~((1 << 23) | (1 << 16) | 7),
    MXC__CCM__WIMR);
    //See mxc__pm__lowpower( ) in arch/arm/mach-mx3/mxc__pm.c
```

At 326, CPU scaling is disabled. CPU scaling allows for dynamic changes in processor frequency, typically to minimize power consumption. For example, a CPU performing an intensive set of tasks may operate at the highest processor frequency to maximize throughput. In contrast, the same CPU when processing very simple tasks may operate at a lower processor frequency to minimize power consumption. To minimize wakeup latencies, the processor may be set to resume operation at a maximum supported operational frequency.

At 328, a wait-for-interrupt (WFI) instruction is executed. In one implementation the kernel may execute the following instructions:

C Sample Code 12

```
/*
 * For WFI errata TLSbo65953
 *
 * Without the work around this could simply be:
 *    WFI; nop; nop; nop; nop; nop;
 */
    __asm____volatile__(
    "mrc p15, 0, %0, c1, c0, 0\n"
    "bic %0, %0, #0x00001000\n"
    "bic %0, %0, #0x00000004\n"
    "mcr p15, 0, %0, c1, c0, 0\n"
    "mov %0, #0\n"
    "mcr p15, 0, %0, c7, c5, 0\n"
    "mov %0, #0\n"
    "mcr p15, 0, %0, c7, c14, 0\n"
    "mov %0, #0\n"
    "mcr p15, 0, %0, c7, c0, 4\n"
    "nop\n" "nop\n" "nop\n" "nop/n"
    "nop\n" "nop\n" "nop/n"
    "mrc p15, 0, %0, c1, c0, 0\n"
    "orr %0, %0, #0x00001000\n"
    "orr %0, %0, #0x00000004\n"
    "mcr p15, 0, %0, c1, c0, 0\n"
    :: "r" (reg));
    //See arch/arm/mach-mx3/mxc__pm.c
```

At 330, the main CPU clock is gated, and the PMIC completes transition to low power mode. At this point, powered components in computer system 100 include the PMIC 104 in low power standby mode and external memory 144 in self-refresh mode. In this example, inactive components include CPU 112, cache memory 120, CPU clock(s) 114, cache clocks 122, EMI 132, etc.

Figure 4:
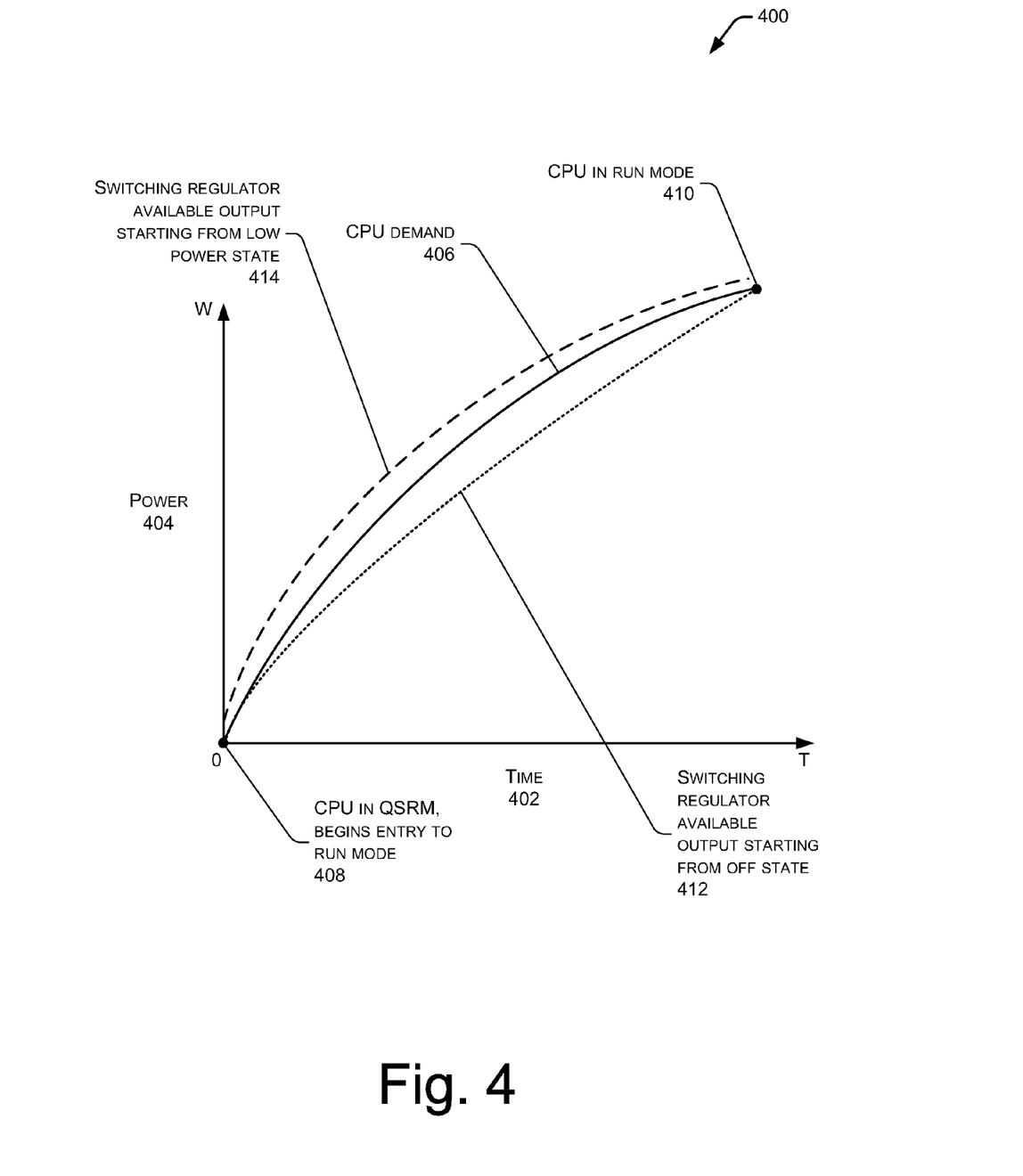
FIG. 4 is a graph of power demand as a function of time for a processor during exit from the QSRM through entry into run mode compared to available current from a switching regulator starting from an off state and a switching regulator starting from a low power state.

FIG. 4 is an illustrative graph 400 of power demand of a processor as a function of time during exit from QSRM through entry into run mode compared to available power from a switching regulator starting from an off state and a switching regulator starting from a low power state. Elapsed time is indicated along a horizontal axis 402, ranging from time zero to time "T." A vertical axis 404 shows power, ranging from zero to "W." A plot 406 with a solid line indicates the power demand for a CPU 112 starting from an QSRM indicated at point 408 and continuing through the CPU achieving run mode at point 410.

A plot 412 with a dotted line shows the power available from a switching regulator which has been powered up from an off state. As shown, this curve is below that of CPU power demand 406. When this occurs, the CPU has insufficient power to operate, and may behave erratically, resulting in system instability.

A plot 414 with a dashed line shows the power available from a switching regulator starting from a low power state. As shown, this curve is above that of CPU power demand 406, indicating that the switching regulator is able to provide sufficient power for reliable, stable operation of the CPU.

Thus, maintaining the switching regulator which provides power to the CPU in a low power state results in a faster and more stable recovery from QSRM into run mode.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A computer-implemented method of placing a system including a processor into a low power mode, the method comprising:
   stopping running user-space processes and kernel threads executing on the processor;
   saving state of the user-space processes and kernel threads in memory;
   placing an input/output device coupled to the processor into a suspend mode;
   configuring a wakeup source coupled to the processor to generate interrupts;
   gating a clock defined in a clock gating register of the processor;
   placing a linear regulator on a power management integrated circuit (PMIC) of the system into an off state;
   placing a switching regulator on the PMIC into low power state;
   preparing the PMIC to enter a low power mode;
   setting a processor state retention mode in a clock control module coupled to the processor;
   flushing a cache coupled to the processor;
   disabling interrupt requests to the processor except for interrupts from the wakeup sources;
   disabling processor scaling in the processor;
   executing a wait for interrupt instruction configured to receive the wakeup interrupt from the wakeup source;
   gating a main clock of the processor; and
   placing the PMIC in the low power mode.

2. The method of claim 1, further comprising gating a serial peripheral interface clock and a universal serial bus clock after placing the switching regulator on the PMIC into the low power state.

3. The method of claim 1, wherein the flushing comprises flushing a primary cache coupled to the processor and a secondary cache coupled to the processor.

4. The method of claim 1, further comprising placing the memory into self-refresh mode after preparing the PMIC to enter the low power mode.

5. The method of claim 1, wherein the placing of the input/output device into the suspend mode comprises saving input/output device state in the memory, putting the input/output device into a low power mode, and gating a clock driving the input/output device.

6. The method of claim 1, wherein the processor comprises an application processor able to gate clocks discretely.

7. The method of claim 1, wherein the wakeup sources comprise at least one of the following: a PMIC event, a network interface, a realtime clock wakeup, or a power button.

8. The method of claim 1, wherein the disabling processor scaling comprises setting the processor to a maximum operational frequency supported by the processor.

9. The method of claim 1, further comprising gating or shutting down devices external to the processor.

10. A system of reducing power consumption in a portable electronic device, the system comprising:
a memory;
a processor coupled to the memory;
a kernel stored in the memory and configured to execute on the processor, the kernel being configured to maintain a switching regulator of a power management integrated circuit (PMIC) in a low power state and a linear regulator of the PMIC in an off state while the system is in a low power mode, wherein the kernel is configured to enter the low power mode by performing the following acts:
stop execution of a running user-space process and kernel thread executing on the processor;
save state of the running user-space process and kernel thread to the memory;
configure a wakeup source to generate an interrupt;
gate a clock which is defined in a clock gating register coupled to the processor;
place into the off state the linear regulator;
place into the low power state the switching regulator;
gate a serial peripheral interface clock or a universal serial bus clock or both which are coupled to the processor;
set a state retention mode for the processor in a clock control module which is coupled to the processor;
disable interrupt generation from a non-wakeup source;
disable processor scaling on the processor; and
gate a main clock of the processor.

11. The system of claim 10, further comprising a peripheral device coupled to the processor and wherein the kernel is further configured to enter the low power mode by performing the following acts:
place the peripheral device into a low power state; and
configure a wakeup source in the peripheral device to generate a wakeup interrupt.

12. The system of claim 10, wherein the kernel is further configured to maintain memory in a self-refresh state after entering the low power mode.

13. The system of claim 10, wherein the switching regulator is configured to provide power to the processor.

14. The system of claim 10, wherein the kernel is further configured to execute a wait for interrupt (WFI) instruction.

15. The system of claim 10, wherein the kernel is further configured to place the PMIC into the low power state after disabling processor scaling.

16. One or more computer-readable storage media storing instructions that, when executed by a processor, cause the processor to perform acts comprising:
stopping running processes and threads executing on a central processing unit (CPU);
saving state of the processes and threads to a memory;
placing input or output or both devices into a low power or suspend state;
configuring a wakeup source to generate an interrupt;
gating clocks defined in clock gating register;
placing into an off state a linear regulator of a power management integrated circuit (PMIC), the linear regulator configured to provide power to a gated device;
placing into a low power state a switching regulator of the PMIC, the switching regulator configured to provide power to the CPU;
gating a serial peripheral interface clock or a universal serial bus clock or both;
setting a state retention mode for the CPU in a clock control module;
disabling interrupts from a non-wakeup source; and
disabling CPU scaling.

17. The computer-readable storage media of claim 16, wherein the placing of input or output or both devices into a low power or suspend state comprises saving device state in the memory, putting the device into a low power mode, and gating clocks driving the device.

18. The computer-readable storage media of claim 16, further comprising placing the switching regulator of the PMIC into a low power state after gating the serial peripheral interface clock or the universal serial bus clock or both.

19. The computer-readable storage media of claim 16, wherein disabling processor scaling further comprises configuring the CPU to a maximum operational frequency supported by the CPU.

20. The computer-readable storage media of claim 16, further comprising flushing a CPU primary cache, or secondary cache, or both after setting the state retention mode in the clock control module.

21. The computer-readable storage media of claim 16, further comprising executing a wait for interrupt instruction after disabling CPU scaling.

22. The computer-readable storage media of claim 16, further comprising placing the memory into a self-refresh mode.

23. The computer-readable storage media of method of claim 16, wherein the wakeup source comprises at least one of the following: a power management event, a network interface, a realtime clock, or a power button.

* * * * *